United States Patent
Saito et al.

(10) Patent No.: US 11,741,153 B2
(45) Date of Patent: Aug. 29, 2023

(54) TRAINING DATA ACQUISITION APPARATUS, TRAINING APPARATUS, AND TRAINING DATA ACQUIRING METHOD

(71) Applicant: KABUSHIKI KAISHA TOSHIBA, Tokyo (JP)

(72) Inventors: Hiroo Saito, Kawasaki Kanagawa (JP); Tomoyuki Shibata, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 367 days.

(21) Appl. No.: 17/249,359

(22) Filed: Feb. 26, 2021

(65) Prior Publication Data

US 2022/0067081 A1     Mar. 3, 2022

(30) Foreign Application Priority Data

Aug. 27, 2020    (JP) ................................ 2020-143678

(51) Int. Cl.

| | | |
|---|---|---|
| G06F 16/532 | (2019.01) | |
| G06V 10/774 | (2022.01) | |
| G06F 40/279 | (2020.01) | |
| G06F 16/538 | (2019.01) | |
| G06F 16/51 | (2019.01) | |

(Continued)

(52) U.S. Cl.
CPC ............ *G06F 16/532* (2019.01); *G06F 16/51* (2019.01); *G06F 16/538* (2019.01); *G06F 16/55* (2019.01); *G06F 16/5846* (2019.01); *G06F 40/279* (2020.01); *G06V 10/774* (2022.01); *G06F 18/2148* (2023.01); *G06F 18/2193* (2023.01); *G06F 18/22* (2023.01)

(58) Field of Classification Search
None
See application file for complete search history.

(56) References Cited

U.S. PATENT DOCUMENTS

| | | | | |
|---|---|---|---|---|
| 2013/0212094 | A1* | 8/2013 | Naguib | .................... G01S 5/16 |
| | | | | 707/730 |
| 2015/0161170 | A1* | 6/2015 | Yee | ........................ G06F 16/50 |
| | | | | 382/224 |

FOREIGN PATENT DOCUMENTS

| | | |
|---|---|---|
| JP | 2013-25398 A | 2/2013 |
| JP | 2020-35095 A | 3/2020 |

OTHER PUBLICATIONS

B. Alexe, et al. "Measuring the objectness of Image Windows," IEEE Transactions on Pattern Analysis and Machine Intelligence, vol. 34, No. 11, 14 pages (2012).

(Continued)

*Primary Examiner* — Bernard Krasnic
(74) *Attorney, Agent, or Firm* — Finnegan, Henderson, Farabow, Garrett & Dunner, LLP

(57) ABSTRACT

According to one embodiment, an apparatus includes a first acquisition unit, a second acquisition unit, an identification unit, and an output unit. The first acquisition unit acquires a query image and a query text relating to a target object. The second acquisition unit acquires candidate images of the target object. The identification unit identifies from the candidate images a positive image containing a region demonstrating a similarity to the query image higher than or equal to a first threshold value, and identifies a position of the region in the positive image. The output unit outputs training data including the positive image, information representing the position of the region, and a correct label.

12 Claims, 9 Drawing Sheets

(51) Int. Cl.
*G06F 16/55* (2019.01)
*G06F 16/583* (2019.01)
*G06F 18/22* (2023.01)
*G06F 18/214* (2023.01)
*G06F 18/21* (2023.01)

(56) References Cited

OTHER PUBLICATIONS

A. Krizhevsky, et al. "ImageNet Classification with Deep Convolutional Neural Networks," NIPS 2012, 9 pages (2012).
W. Liu, et al., "SSD: Single Shot and MultiBox Pattern Detector," Computer Vision and Pattern Recognition (cs. CV), arXiv:1512.02325v5, 17 pages (2016).

* cited by examiner

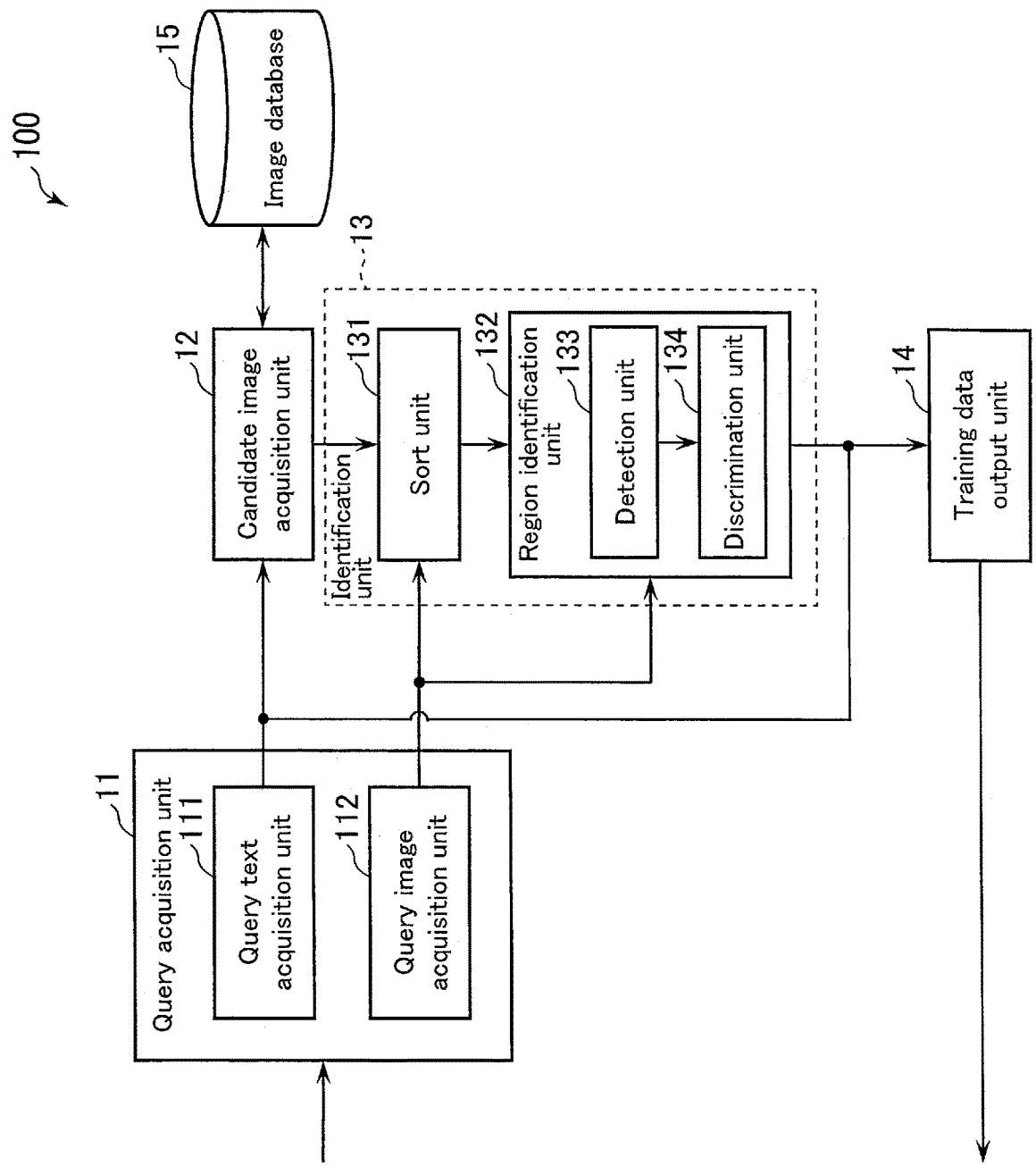
F I G. 1

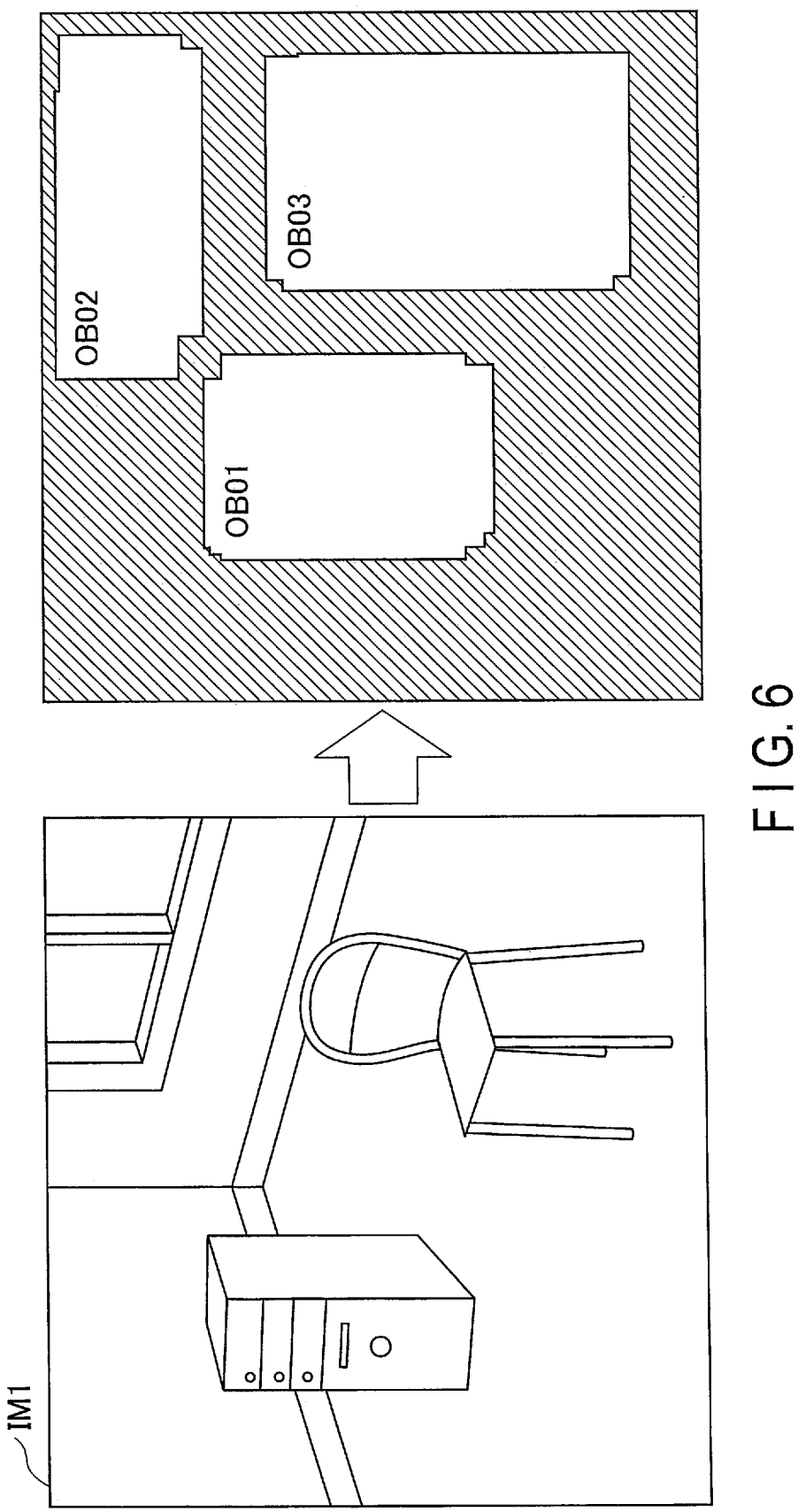
F I G. 6

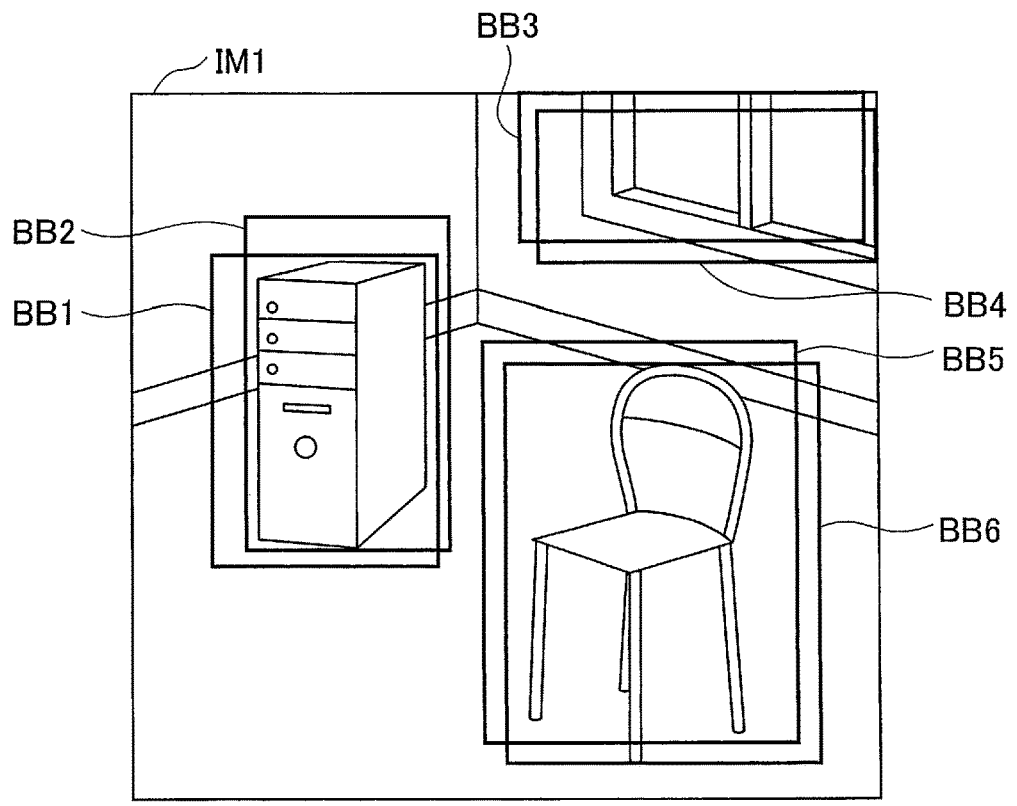
F I G. 7
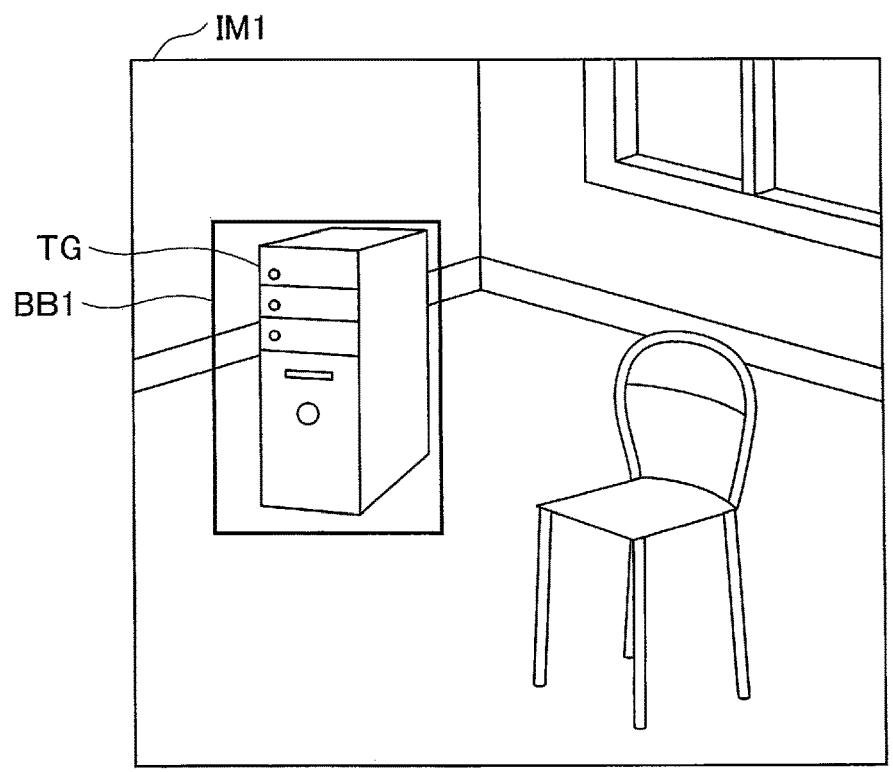
F I G. 8

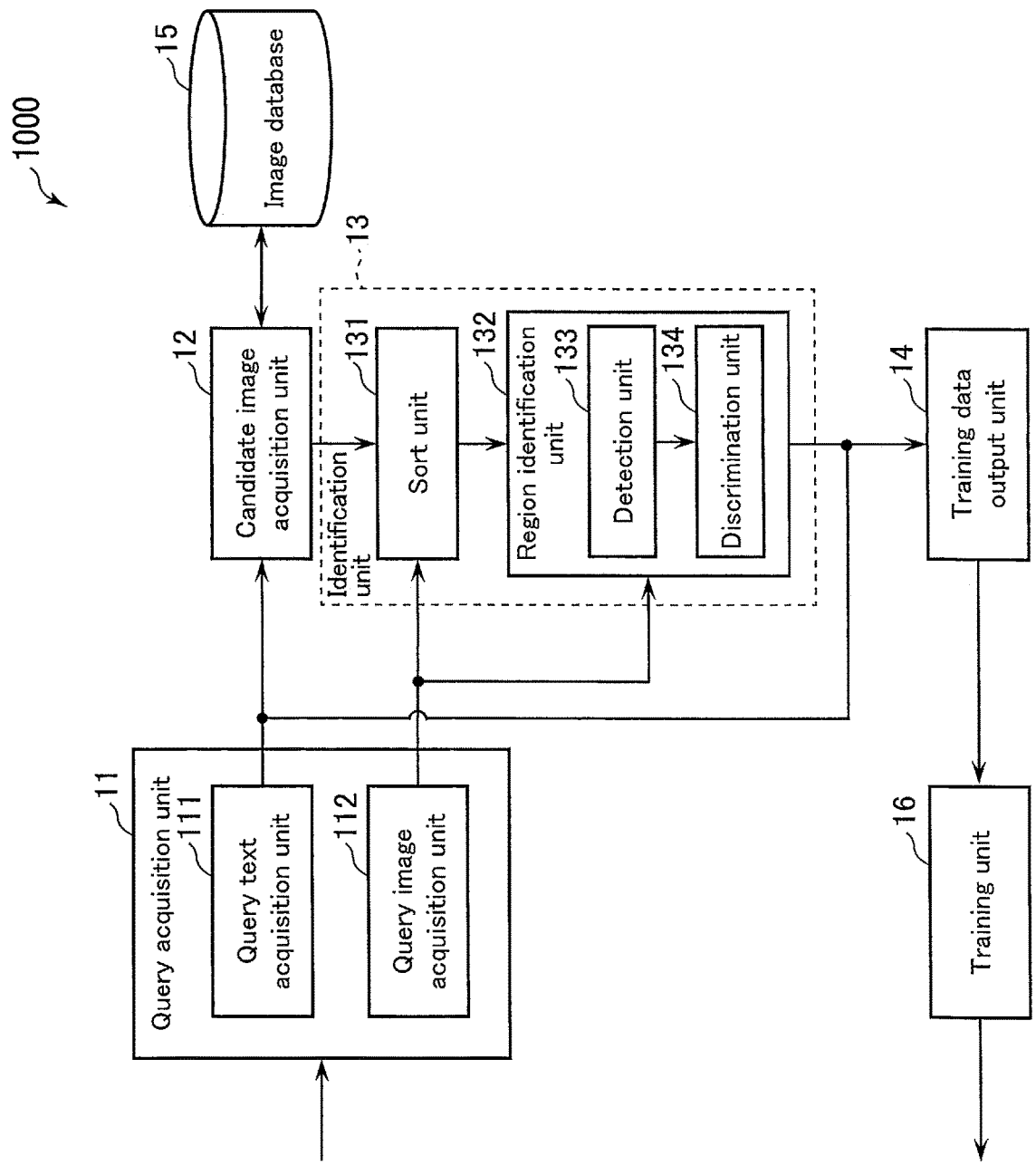
F I G. 9

TRAINING DATA ACQUISITION APPARATUS, TRAINING APPARATUS, AND TRAINING DATA ACQUIRING METHOD

CROSS REFERENCE TO RELATED APPLICATIONS

This application is based upon and claims the benefit of priority from Japanese Patent Application No. 2020-143678, filed Aug. 27, 2020, the entire contents of which are incorporated herein by reference.

FIELD

Embodiments described herein relate generally to a training data acquisition apparatus, a training apparatus, and a training data acquiring method.

BACKGROUND

A technique of detecting an object from an image based on machine learning has been proposed. Conventionally, training data for such machine learning has been prepared by acquiring, using manpower, images that contain a detection target object and manually teaching the region of the object in the images, which incurs considerable cost.

To reduce the cost, the acquisition scheme may be designed such that manual teaching can be performed with regard to only part of the data to obtain a model as a result of the training, and ultimate training data can be acquired through inference using this model.

The conventional method, however, needs images of a detection target object to be acquired in advance. Furthermore, the method still requires manpower teaching and manual corrections to the recognition results.

BRIEF DESCRIPTION OF THE DRAWINGS

FIG. 1 is a block diagram showing an exemplary functional structure of a training data acquisition apparatus according to the first embodiment.

FIG. 6 is a diagram showing a sorting process, with which candidate object regions are extracted from a candidate image.

FIG. 7 is a diagram showing a region identifying process, with which candidate object regions are extracted from a candidate image.

FIG. 8 is a diagram showing an image in which an object region is identified.

FIG. 9 is a block diagram showing an exemplary functional structure of a training apparatus according to the second embodiment.

DETAILED DESCRIPTION

Figure 2:
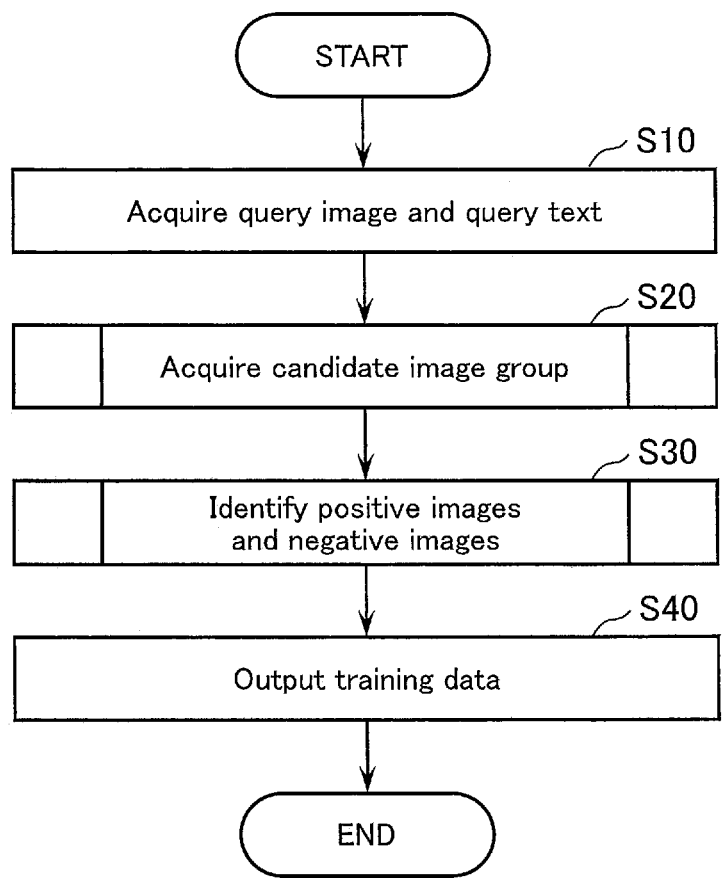
FIG. 2 is a flowchart showing an overview of the entire process of the training data acquisition apparatus illustrated in FIG. 1.

According to one embodiment, a training data acquisition apparatus includes a first acquisition unit, a second acquisition unit, an identification unit, and a training data output unit. The first acquisition unit is configured to acquire a query image and a query text relating to a target object. The second acquisition unit is configured to acquire candidate images of the target object, using the query text. The identification unit is configured to, using the query image, identify from the candidate images a positive image containing a region demonstrating a similarity to the query image higher than or equal to a first threshold value, and identify a position of the region in the positive image. The training data output unit is configured to output training data including the positive image, information representing the position of the region in the positive image, and a correct label based on the query text.

Hereinafter, various embodiments will be described with reference to the accompanying drawings.

First Embodiment (1) Structure

FIG. 1 shows an exemplary structure of a training data acquisition apparatus 100 according to the first embodiment.

The training data acquisition apparatus 100 is configured to acquire and output training data used for training of an object detection model. The training data acquisition apparatus 100 may be a computer such as a personal computer and server computer, which is not a limitation.

The training data acquisition apparatus 100 includes a query acquisition unit 11, a candidate image acquisition unit 12, an identification unit 13, a training data output unit 14, and an image database 15.

The query acquisition unit 11 serves as a first acquisition unit, acquiring text information and image information for identifying a detection target object (also referred to as a "target object") based, for example on the data input by the user of the training data acquisition apparatus 100. For instance, if the target object is a specific product of a beverage manufacturer, the query acquisition unit 11 acquires an image of a logo designating this product, and a keyword such as the name of the manufacturer or the name of the product.

The query acquisition unit 11 may include a query text acquisition unit 111 and a query image acquisition unit 112. The query text acquisition unit 111 acquires, as text data input by the user, text information (hereinafter referred to as "query text"), which serves as a search query for a target object. The query image acquisition unit 112 acquires, as image data input by the user, image information (hereinafter referred to as "query image"), which serves as a search query for the target object.

The query text acquisition unit 111 does not always require input of text data, and may acquire a query text by extracting text information from a query image acquired by the query image acquisition unit 112. The query text acquisition unit 111 may use a character recognition technique to extract text information from the query image. Similarly, the query text acquisition unit 111 may acquire a query text by extracting text information from other image data or voice data input by the user.

The image database 15 may be an image search database in which keywords and images are associated in advance with each other. The image database 15 may store images acquired in advance through the World Wide Web (WWW) or the like. An "image" here may include a still image and a moving image. The image database 15 is not an essential component of the training data acquisition apparatus 100, however. The image database 15 may be provided in the training data acquisition apparatus 100, or may be a database accessible from the training data acquisition apparatus 100 through a network.

The candidate image acquisition unit 12 serves as a second acquisition unit, acquiring a candidate image of a target object, using a query text acquired by the query text acquisition unit 111. For instance, the candidate image acquisition unit 12 uses the query text as a search query and searches the image database 15 for any images corresponding to the query text, thereby acquiring a first candidate image group as candidate images of the target object. According to the present embodiment, the candidate image acquisition unit 12 further acquires candidate images that presumably do not contain the target object. For instance, the candidate image acquisition unit 12 searches the image database 15, using any query other than the acquired query text, thereby acquiring a second candidate image group of images that presumably do not contain the target object. The candidate image acquisition unit 12 sends both the first candidate image group and second candidate image group to the identification unit 13.

Using the query image acquired by the query image acquisition unit 112, the identification unit 13 identifies positive images containing a region demonstrating a similarity to the query image higher than or equal to a threshold value, from the candidate image group so as to be used as training data. The identification unit 13 further identifies the position of the region in each of the positive images. According to the present embodiment, the identification unit 13 further identifies negative images containing no region demonstrating a similarity to the query image higher than or equal to the threshold value, from the candidate image group. The negative images may be used together with the positive images, as training data. The identification unit 13 includes a sort unit 131 and a region identification unit 132.

The sort unit 131 sorts the images of the candidate image group acquired by the candidate image acquisition unit 12 into positive candidate images and negative candidate images, in accordance with their similarities to the query image. As mentioned earlier, the candidate image group acquired by the candidate image acquisition unit 12 includes a first candidate image group of candidate images containing the target object, and a second candidate image group of candidate images not containing the target object. There is a possibility, however, that candidate images that do not contain the target object may be included in the first candidate image group, or candidate images that contain the target object may be included in the second candidate image group, since these candidate image groups are merely searched based on a keyword associated with the images from the image database 15. For this reason, the sort unit 131 executes a process for sorting the candidate images of the candidate image groups in accordance with their similarities to the query image.

According to the present embodiment, the sort unit 131 first extracts any region in which an object is shown (hereinafter referred to as a "candidate object region") from every candidate image. Next, the sort unit 131 clips the extracted candidate object regions from the image, and calculates the similarity to the query image. The sort unit 131 determines any image that contains a region demonstrating a similarity higher than or equal to a first threshold value, as a positive candidate image, while determining any image that contains no region demonstrating a similarity higher than or equal to a first threshold value, as a negative candidate image. The detailed operation of the sort unit 131 will be discussed later.

The region identification unit 132 identifies an image that contains a region (hereinafter referred to as an "object region") demonstrating a similarity to the query image higher than or equal to a predetermined threshold value from the candidate images sorted by the sort unit 131 as positive candidate images, and further identifies the position of the object region in the image. The region identification unit 132 may first detect candidate object regions from a positive candidate image, and determine each of the detected candidate object regions demonstrating a similarity to the query image higher than or equal to a second threshold value to be an object region. Then, the region identification unit 132 outputs, as a positive image, an image containing an object region out of the positive candidate images, together with the positional information of the object region. The second threshold value may take a value the same as, or different from, the first threshold value. Similarly, the region identification unit 132 further detects candidate object regions from the candidate images sorted by the sort unit 131 as negative candidate images, identifies images that contain no region demonstrating a similarity to the query image higher than or equal to a third threshold value, and outputs the identified image as a negative image. The third threshold value is set to be lower than or equal to the second threshold value.

According to the embodiment, the region identification unit 132 may include a detection unit 133 and a discrimination unit 134. The detection unit 133 is capable of extracting candidate object regions from each candidate image, using a trained detector. The detector may be trained in advance with a large volume of training data with labels attached, for example. There is a possibility, however, that the target object of the training data that the training data acquisition apparatus 100 according to the present embodiment is trying to acquire may be of a category yet to be included in the training data used for the training of the detector, and therefore that the target object of the training data may not be suitably detected. For this reason, the detection unit 133 is configured to make an adjustment, for example, by lowering the threshold value of the evaluation value of the detection result so that candidates of the object region can be suitably extracted. In this manner, a large number of regions containing objects other than the detection target object may be extracted.

The discrimination unit 134 is capable of discriminating a target object region (object region) from the extracted candidate object regions, using a trained discriminator. For this discrimination, the discrimination unit 134 uses a feature vector obtained by clipping candidate object regions extracted by the detection unit 133 from an image and inputting the image of the clipped-out region to the trained discriminator. The discriminator may be trained in advance with a large volume of training data with labels attached, for example. The discrimination unit 134 is configured to calculate a similarity between the feature vector obtained from each of the candidate object regions and a feature vector obtained from the query image in a similar manner and thereby determine whether or not the candidate object region is an object region. The discrimination unit 134 identifies an image containing an object region as a positive image, further identifies the position of the object region in the positive image, for example as coordinate information, and outputs this position together with the positive image.

The detailed operation of the region identification unit 132 will be described later.

The sort unit 131 and region identification unit 132 do not always need to be provided as separate functional units. As mentioned later, the operation of the sort unit 131 and the operation of the region identification unit 132 include similar processing. This is because the present embodiment adopts two-step processing, namely, a sorting process performed at the sort unit 131 by an algorithm placing the processing speed at a higher priority to handle a large number of candidate images, and a region identifying process performed at the region identification unit 132 by an algorithm placing the processing accuracy at a higher priority to handle the candidate images narrowed down by the sorting process. This is not a limitation, however. The sort unit 131 and the region identification unit 132 may adopt the same algorithm for the processes in an overlapping manner, or may omit one of the overlapping processes.

The training data output unit 14 attaches a correct label based on the query text, to the identified positive image and the positional information of the object region in the positive image, which are output by the identification unit 13, and outputs the resultant data as positive training data. If the identification unit 13 also identifies a negative image, the training data output unit 14 attaches to the negative image a label different from the correct label, and outputs the resultant data as negative data. For the negative data, positional information will not be output. The training data output by the training data output unit 14 includes at least positive data, and may also include negative data.

As describe above, the training data acquisition apparatus 100 according to the first embodiment first acquires a query image and a query text based on the data input by the user in order to identify a to-be-detected object (target object). The training data acquisition apparatus 100 requires input of at least a query image for identification of the target object. The number of input query images required, however, may be less than the number of items of training data acquired by the training data acquisition apparatus 100.

Next, using the query text as a search query, the training data acquisition apparatus 100 extracts candidate images from the image search database, which stores keywords and images in association with each other. Then, the training data acquisition apparatus 100 finds a similar region between the query image and individual candidate images, and thereby identifies positive images and negative images from the candidate images. With regard to the positive images, the region of the target object is automatically detected in each image. Based on the positive images including the positional information of the region of the target object and the negative images, the training data acquisition apparatus 100 outputs training data that includes positive data and negative data.

(2) Operation

Next, an exemplary information processing operation performed by the above training data acquisition apparatus 100 will be explained.

(2-1) Overview

FIG. 2 is a flowchart showing an overview of the entire process of the training data acquisition apparatus 100. First, at step S10, the training data acquisition apparatus 100 acquires, at the query acquisition unit 11, a query image and a query text for identifying a to-be-detected object. The query image and query text may be acquired based on a combination of image data and text data that are input by way of an input device by the user of the training data acquisition apparatus 100. At step S10, at least one query image should be acquired to identify the detection target object, or a plurality of images may be acquired. The number of query images acquired by the query acquisition unit 11 may be far less than the number of images generally required for training of an object detector.

Similarly, as a query text, at least one term that represents the detection target object should be acquired, or a plurality of terms such as synonyms may be acquired. A query text may be acquired based on the text data input by the user by way of a keyboard or the like, voice data input through a microphone or the like, or image data input by way of an external memory or the like. The extraction of text data from voice data may be achieved using a well-known voice recognition technique or linguistic analysis technique. The extraction of text data from image data may be realized using a well-known character recognition technique such as an optical character reader (OCR) or a trained object detector. A query text may be acquired from a query image. If this is the case, the training data acquisition apparatus 100 needs to receive input of at least query image data from the user for identification of the detection target object.

In the following example, an image of a "desktop personal computer" (hereinafter simply referred to as "PC") is acquired as a query image by the query acquisition unit 11. If this is the case, a query text may be "PC", "desktop PC", "computer" and the like.

At step S20, the training data acquisition apparatus 100 acquires, at the candidate image acquisition unit 12, a candidate image group from the image database 15, using a query text. According to the present embodiment, the candidate image group acquired by the candidate image acquisition unit 12 includes a first candidate image group containing images that are found based on the query text, and a second candidate image group containing images that are found based on any query other than this query text. The detailed operation of step S20 will be discussed later. The candidate image acquisition unit 12 sends both the acquired first candidate image group and second candidate image group to the identification unit 13.

At step S30, the training data acquisition apparatus 100 identifies, at the identification unit 13, positive images and negative images from the candidate image group received from the candidate image acquisition unit 12, using the query images. As mentioned above, the candidate image group that the identification unit 13 receives from the candidate image acquisition unit 12 may contain the first candidate image group containing images found based on the query text and the second candidate image group containing images found based on any query other than the query text. The images in the first candidate image group, however, may not always include an object identified by the query text, and the images in the second candidate image group may not always exclude the object identified by the query text. The identification unit 13 therefore identifies positive images and negative images from the candidate image group based on whether a region (object region) demonstrating a similarity to the query image higher than or equal to a predetermined threshold value is included. With regard to the identified positive images, the identification unit 13 further identifies the position of the identified object region in each image, and outputs information showing the position of the object region in the positive image, such as coordinate information. The detailed operation of step S30 will be discussed later.

Finally, at step S40, the training data acquisition apparatus 100 generates and outputs, at the training data output unit 14, training data including positive data and negative data based on the identified positive images and negative images. The positive data includes the identified positive images, information indicating the position of the object region in each of the positive images, and a correct label based on the query text. The training data output unit 14 may adopt the query text acquired by the query acquisition unit 11 as-is as a correct label. The negative data includes negative images and a label indicating that the object identified by the query text is not included. The label to be attached to the negative data can be freely selected as long as it is different from the correct label. The training data output from the training data output unit 14 may be stored in a not-shown memory, presented to the user via an output device, or transmitted to an external device via a communication device.

(2-2) Acquisition of Candidate Image Group

Figure 3:
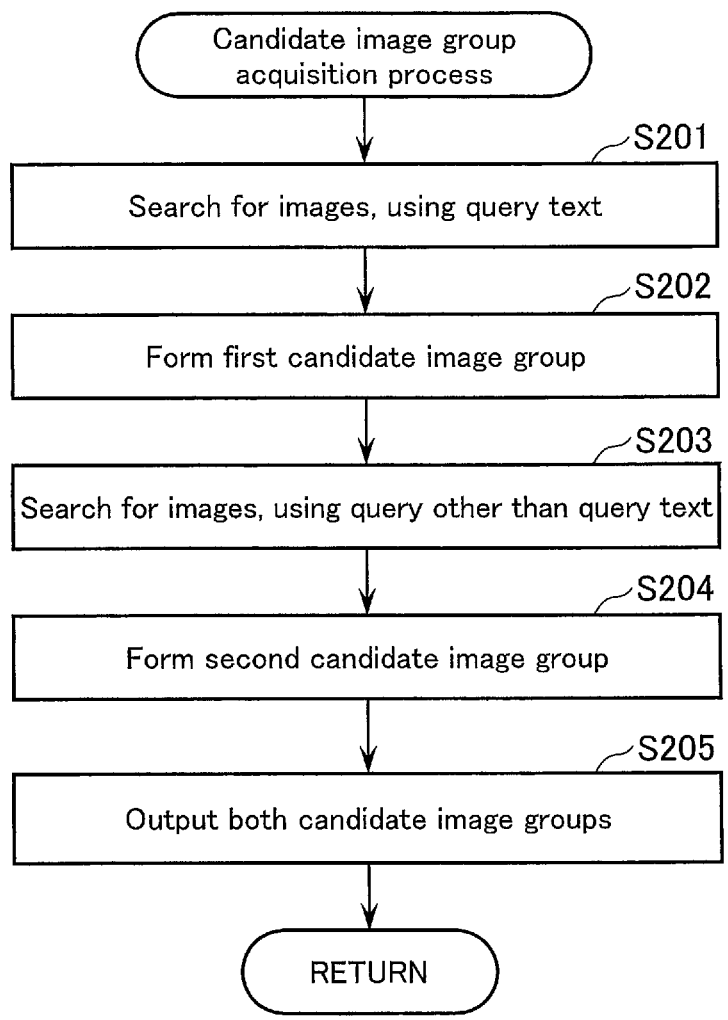
FIG. 3 is a flowchart of the processing step of acquiring a candidate image group in the process of FIG. 2.

FIG. 3 is a flowchart showing the detailed process of the candidate image acquisition unit 12 acquiring a candidate image group, illustrated in step S20 of FIG. 2.

At step S201, using a query text, the candidate image acquisition unit 12 searches the image database 15 for candidate images containing a target object.

At step S202, the candidate image acquisition unit 12 defines a group of images found using the query text, as a first candidate image group.

At step S203, the candidate image acquisition unit 12 searches the image database 15 for candidate images that exclude the target object, using any query other than the query text. The candidate image acquisition unit 12 may use output results obtained when a randomly created keyword or a randomly selected image from the existing data is adopted as a query.

At step S204, the candidate image acquisition unit 12 defines a group of images found using any query other than the query text, as a second candidate image group.

At step S205, the candidate image acquisition unit 12 outputs both the first candidate image group and the second candidate image group to the identification unit 13. To the first candidate image group and second candidate image group, information such as the keywords that have been used for the search may be attached to distinguish them from each other.

(2-3) Identification of Positive Images and Negative Images

Figure 4:
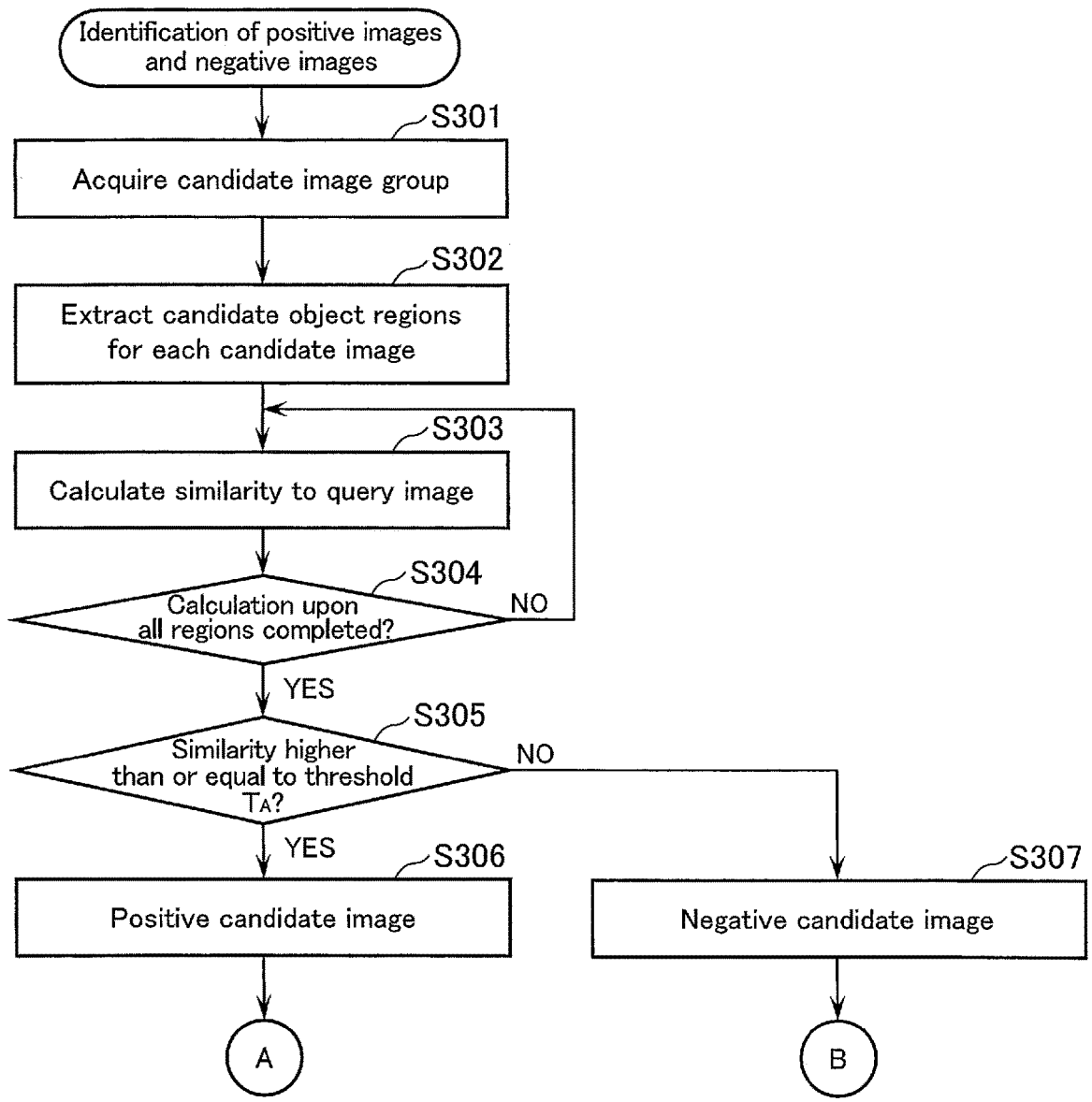
FIG. 4 is a flowchart of the first half of the processing step of identifying positive images and negative images in the process of FIG. 2.
Figure 5:
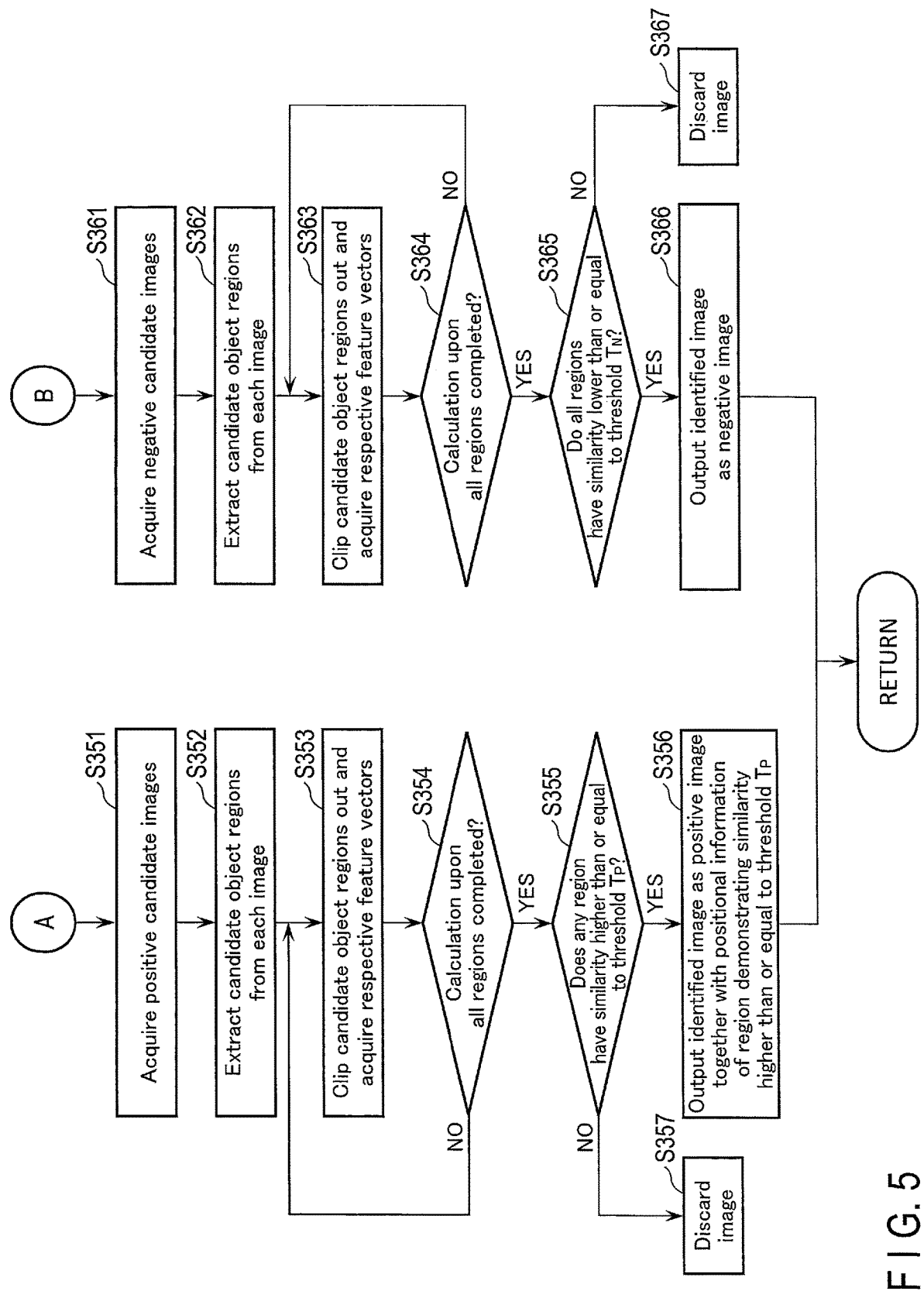
FIG. 5 is a flowchart of the second half of the processing step of identifying positive images and negative images in the process of FIG. 2.

FIGS. 4 and 5 are flowcharts of an exemplary process of the identification unit 13 identifying positive images and negative images illustrated in step S30 of FIG. 2.

According to the present embodiment, the process for identifying positive images and negative images from the candidate image group includes a sorting process executed by the sort unit 131 and a region identifying process executed by the region identification unit 132. The sort unit 131 executes a process for sorting images of the candidate image group into positive candidate images and negative candidate images, mostly based on the similarity to the query image. The region identification unit 132 identifies positive images that contain a region demonstrating a similarity to the query image higher than or equal to a predetermined threshold value from the positive candidate images, and further identifies positional information of this region. The region identification unit 132 further identifies negative images that exclude a region demonstrating a similarity to the query image higher than or equal to the predetermined threshold value from the negative candidate images.

In the explanation provided below, because of the identification unit 13 adopting two-step processing that uses different algorithms, steps of extracting candidate object regions from a candidate image, clipping the candidate object regions from the image, and calculating a similarity with respect to the query image are performed in both the sorting process and the region identifying process. This is not a limitation, however. The identification process at step S30 does not always need to be divided into the process executed by the sort unit 131 and the process executed by the region identification unit 132, as shown below. In addition, the identification unit 13 does not need to adopt two-step processing, and may be replaced with single-step processing.

(2-3-1) Sorting Process

FIG. 4 is a flowchart of an exemplary sorting process executed by the sort unit 131 in the process of step S30 in FIG. 2.

First, at step S301, the sort unit 131 acquires a candidate image group from the candidate image acquisition unit 12. The candidate image group, which is a process target for the sort unit 131, may include a first candidate image group obtained using a query text, and a second candidate image group obtained using any query other than the query text, as mentioned earlier. The sort unit 131 may execute the following process, regardless of whether the process-target image is of the first candidate image group or of the second candidate image group.

At step S302, the sort unit 131 extracts candidate object regions for each candidate image. The extraction of candidate object regions can be conducted using any method. For instance, the extraction may be conducted with a technique based on "objectness" and "saliency" (see, for example, B. Alexe et al., "Measuring the objectness of Image Windows", IEEE Transactions on Pattern Analysis and Machine Intelligence, Volume 34, Issue 11, Nov. 2012).

FIG. 6 is an illustration in which candidate object regions are extracted from an image based on the objectness. An image IM1 on the left side of FIG. 6 shows a photographed room interior obtained from the image database 15 by the candidate image acquisition unit 12 using a query text "PC". The image IM1 contains a PC, a window, and a chair placed in the room. At step S302, regions OB01 to OB03 each demonstrating a high degree of objectness are detected at the respective positions of the PC, window, and chair, as illustrated on the right side of FIG. 6. The image IM1 is not limited to a photo image but may be an illustration or painting.

At step S303, the sort unit 131 clips the extracted candidate object regions out of the image, and calculates the similarity between the clipped-out image region and the query image. The calculation of the similarity may be realized through calculation of a Euclidean distance or cosine similarity, which can be performed by adopting as a feature amount the brightness or the output of a deep learning model that has been trained with other training data.

At step S304, the sort unit 131 determines whether the calculation of the similarity to the query image is conducted upon all the regions clipped out of the candidate images. The operation of step S303 is repeated until the calculation of the similarity is completed for all the regions, after which the process proceeds to step S305.

At step S305, the sort unit 131 determines whether a candidate image contains a region demonstrating a similarity higher than or equal to a predetermined first threshold value $T_A$. If the candidate image contains at least one region demonstrating a similarity to the query image higher than or equal to the first threshold value $T_A$ (Yes), the process proceeds to step S306, while if the candidate image contains no region demonstrating a similarity to the query image higher than or equal to the first threshold value $T_A$ (No), the process proceeds to step S307.

At step S306, the sort unit 131 outputs this image to the region identification unit 132 as a positive candidate image that is highly likely to contain a detection target object (A).

On the other hand, at step S307, the sort unit 131 outputs this image to the region identification unit 132 as a negative candidate image that is highly likely to not contain the detection target object (B).

The sort unit 131 may conduct this sorting process upon all the candidate images received from the candidate image acquisition unit 12. As indicated in steps S305 to S307, the sort unit 131 conducts a comparison with a predetermined single threshold value $T_A$ to find a region demonstrating a similarity to the query image higher than or equal to the threshold value $T_A$, and in accordance with the presence/absence of such a region, the sort unit 131 sorts the candidate images into positive candidate images and negative candidate image. This is a mere example, and multiple threshold values may be adopted in the sorting process. For instance, at step S305, a comparison with a threshold value $T_{A1}$ may be performed with regard to the first candidate image group, and a comparison with a threshold value $T_{A2}$ may be performed with regard to the second candidate image group (where $T_{A1} \neq T_{A2}$).

(2-3-2) Region Identifying Process

FIG. 5 is a flowchart of an exemplary region identifying process executed by the region identification unit 132 in the process of identifying positive images and negative images.

The region identification unit 132 executes a process of extracting candidate object regions from each of the positive candidate images, discriminating object regions corresponding to the detection target object, and finally identifying a positive image (steps S351 to S357). The region identification unit 132 also executes a process of extracting candidate object regions from each of the negative candidate images, and finally identifying a negative image (steps S361 to S367).

(2-3-2-1) Identification of Positive Images

First, at step S351, the region identification unit 132 acquires positive candidate images from the sort unit 131.

At step S352, the region identification unit 132 extracts at the detection unit 133 candidate object regions from each of the positive candidate images. This may be realized by using a detector trained with a large volume of label-attached training data (see, for example, W. Liu et al. "SSD: Single Shot MultiBox Detector", ECCV 2016).

FIG. 7 is an illustration in which candidate object regions are extracted from the image IM1 illustrated on the left side of FIG. 6. In FIG. 7, six regions BB1 to BB6 are extracted as candidate object regions. As illustrated in this drawing, in addition to a candidate object region containing the detection target PC, candidate object regions containing objects other than the detection target PC are extracted at step S352. It is assumed here that the detection target object may be of a category yet to be included in the training data used for the training of the detector. The detection unit 133 therefore may output candidate object regions by lowering the threshold value for the evaluation value of the detection results. The lowered threshold value allows a large number of regions which do not contain the detection target and which do not contain the detection target to be output. Thus, the region identification unit 132 discriminates regions containing the detection target object from the candidate object regions.

At step S353, the region identification unit 132 clips out an image of the extracted candidate object region at the discrimination unit 134, and acquires a feature vector of the clipped-out image. This may be realized by using the output of the discriminator that has been trained with a large volume of label-attached training data (see, for example A. Krizhevsky et al., "ImageNet Classification with Deep Convolutional Neural Networks", NIPS 2012).

At step S354, the region identification unit 132 determines whether the calculation of the feature vector is conducted upon all the regions clipped out of the candidate images. The operation of step S353 is repeated until the calculation of the feature vector is completed for all the regions, after which the process proceeds to step S355.

At step S355, the region identification unit 132 determines at the discrimination unit 134 whether or not a positive candidate image contains a region (object region) demonstrating a similarity to the feature vector obtained in a similar manner from the query image higher than or equal to a predetermined second threshold value $T_P$. The second threshold value $T_P$ may be the same value as, or a different value from, the first threshold value $T_A$ adopted in the sorting process. If there is at least one object region (Yes), the process proceeds to step S356, while if there is no object region (No), the process proceeds to step S357.

At step S356, the region identification unit 132 outputs this positive candidate image as a positive image to the training data output unit 14. Here, the region identification unit 132 calculates the positional information of the object region in the image, and outputs this positional information.

FIG. 8 is an illustration of the positive image IM1 output from the region identification unit 132. The positive image IM1 contains a personal computer TG, which is a detection target object, and the positional information of the personal computer TG is indicated by a rectangular region BB1. Together with the identified positive image, the region identification unit 132 outputs the information indicating the position of the rectangular region BB1 in the positive image, such as the coordinates of the corners of the rectangular region BB1, or the coordinates of the center of the rectangular region BB1 and its width and height.

On the other hand, if it is determined at step S355 that there is no region demonstrating a similarity higher than or equal to the threshold value $T_P$ in the positive candidate image, the region identification unit 132 determines that this image is not suitable as training data and discards the image at step S357.

(2-3-2-2) Identification of Negative Images

The region identification unit 132 executes a process upon negative images, similar to the identification of positive images.

At step S361, the region identification unit 132 acquires from the sort unit 131 negative candidate images' that are determined to be less likely to contain the detection target object.

At step S362, the region identification unit 132 extracts at the detection unit 133 candidate object regions from each of the negative candidate images, in a manner similar to step S352. The extraction of candidate object regions can be performed by the trained detector (see, for example, the aforementioned W. Liu et al.).

Next, at step S363, the region identification unit 132 clips out an image of the extracted candidate object regions, and obtains a feature vector of the clipped-out image at the discrimination unit 134 in a manner similar to step S353. For the obtainment of the feature vector, the output of the trained discriminator can be used (see, for example the aforementioned document by A. Krizhevsky et al.).

At step S364, the region identification unit 132 determines whether the calculation of the feature vector is conducted upon all the regions clipped out of the candidate images, in a manner similar to step S354. The operation of step S363 is repeated until the calculation of the feature vector is completed for all the regions, after which the process proceeds to step S365.

At step S365, the region identification unit 132 determines, at the discrimination unit 134, whether or not a similarity between the calculated feature vector for each of the regions in the negative candidate images and the feature vector obtained from the query image in a similar manner is lower than or equal to a predetermined third threshold value $T_N$. The third threshold value $T_N$ is a value smaller than or equal to the second threshold value $T_P$. If the similarity with respect to the query image is lower than or equal to the threshold value $T_N$ in all of the candidate object regions (Yes), the process proceeds to step S366. If there is at least one candidate object region that does not demonstrate a similarity lower than or equal to the threshold value $T_N$ (No), the process proceeds to step S367.

At step S366, the region identification unit 132 outputs this image as a negative image to the training data output unit 14. With regard to the negative images, the region identification unit 132 does not output the positional information of the object region.

On the other hand, if it is determined at step S365 that the negative candidate image contains at least one region demonstrating a similarity larger than the threshold value $T_N$, the region identification unit 132 determines this image to be unsuitable for training data, and discards it at step S367.

As mentioned earlier, the positive images and negative images identified by the identification unit 13 are sent to the training data output unit 14, together with the positional information of the object regions of the positive images. At step S40 in FIG. 2, the training data acquisition apparatus 100 generates positive data at the training data output unit 14, based on the identified positive images, the positional information of the object regions of the positive images, and the correct label, which is based on the query text. Similarly, the training data acquisition apparatus 100 generates negative data at the training data output unit 14, from the identified negative images and the labels attached thereto. The training data output unit 14 may output the training data containing the positive data and negative data to any output destination at any timing. The training data output unit 14 may output only the positive data as training data.

(3) Effects

As described above, the training data acquisition apparatus 100 according to the first embodiment acquires a query image and a query text relating to a detection target object; acquires candidate images for the detection target object using the query text; and identifies from the acquired candidate images, using the query images, positive images containing a region that demonstrates a similarity to the query image higher than or equal to a threshold value. The training data acquisition apparatus 100 further identifies the position of the region in each of the positive images; and outputs training data that includes the positive images, the positional information of the region in each of the positive images, and a correct label based on the query text.

In this manner, the training data acquisition apparatus 100 automatically acquires and outputs training data based on the query images input by the user to identify a detection target object, as well as related query text. The training data, which includes positive images, positional information of the region in the positive images, and a correct label, can be used for the training of an object detection model. As a result, the burden of teaching tasks such as pre-acquisition of images necessary for the acquisition of training data and attachment of labels can be significantly reduced.

Furthermore, the training data acquisition apparatus 100 can acquire, as candidate images, first candidate images through searches using a query text, and second candidate images through searches using a query other than the query text. In this manner, not only candidates for positive images, but also candidates for negative images can be suitably acquired in a well-balanced manner. The training data acquisition apparatus 100 can further identify positive images and negative images for the detection target object from both the first and second candidate images in accordance with the similarity to the query image, and enter both positive images and negative images into the training data. In this manner, the training data acquisition apparatus 100 can automatically acquire and output training data that includes not only positive data but also negative data.

Moreover, in order to identify positive images and negative images, the training data acquisition apparatus 100 may perform two-step processing of a sorting process and a region identifying process. For instance, a high-speed detection algorithm may be adopted for the sorting process, and a high-precision identification algorithm may be adopted for the region identifying process. In this manner, the training data can be accurately acquired, while maintaining the optimal balance between the processing speed and the processing load.

Still further, the training data preferably includes images of various illumination conditions and shooting angles. Thus, by setting suitable threshold values, the training data acquisition apparatus 100 can control the trade-off between increased variety in the extracted data and erroneous inclusion of data that is not a detection target object.

Second Embodiment

The second embodiment relates to a training apparatus that trains an object detector (also referred to as an "object detection model") using the training data acquired by the above described training data acquisition apparatus 100.

(1) Structure

FIG. 9 shows an exemplary structure of a training apparatus 1000 according to the second embodiment.

The training apparatus 1000 includes a query acquisition unit 11, a candidate image acquisition unit 12, an identification unit 13, a training data output unit 14, an image database 15, and a training unit 16. In the structure of the training apparatus 1000 illustrated in FIG. 9, the query acquisition unit 11, candidate image acquisition unit 12, identification unit 13, training data output unit 14, and image database 15 may adopt the same configuration as that of the query acquisition unit 11, candidate image acquisition unit 12, identification unit 13, training data output unit 14, and image database 15 of the training data acquisition apparatus 100 explained with reference to FIG. 1, and therefore a detailed description is omitted.

The training unit 16 trains the object detector using the training data output from the training data output unit 14, through supervised learning. Each time of receiving the training data from the training data output unit 14, the training unit 16 may read the object detector from a not-shown storage unit, and after a certain training process, may output updated parameters of the object detector.

(2) Operation

Figure 10:
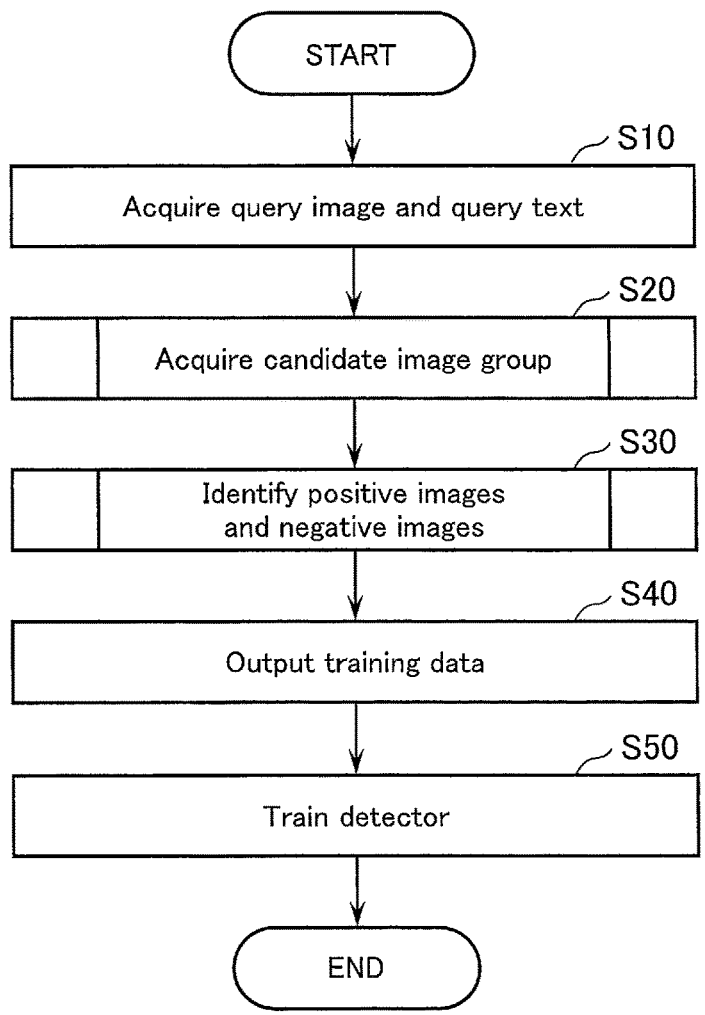
FIG. 10 is a flowchart showing an overview of the entire process of the training apparatus illustrated in FIG. 9.

FIG. 10 is a flowchart showing an overview of the entire process performed by the training apparatus 1000 illustrated in FIG. 9. For steps S10 to S40 of FIG. 10, the same process as that of steps S10 to S40 of FIG. 2 can be adopted, and therefore the detailed description is omitted.

At step S50 of FIG. 10, the training apparatus 1000 performs training of the object detector at the training unit 16, using the training data output from the training data output unit 14. The training unit 16 trains the detector in a manner such that, in response to input of an image, the detector will output the positional information of a target object in the image and a correct label. For the object detector trained by the training unit 16, the detector explained earlier as the one employed by the detection unit 133 may be adopted (see the aforementioned W. Liu et al.).

The timing of training at the training unit 16 may be freely determined. For instance, the training may be performed by the training unit 16 each time the query acquisition unit 11 receives the input of a query from the user and the training data output unit 14 outputs the training data. Alternatively, the training may be performed each time the accumulated training data output from the training data output unit 14 reaches a certain amount, or at certain regular intervals.

After the training at the training unit 16, the training apparatus 1000 may store the parameters of the trained detector in the storage unit, present the parameters to the user on the display or the like, or output the parameters to an external device via a communication device or the like.

(3) Effects

As described above, in the training apparatus 1000 according to the second embodiment, which includes the query acquisition unit 11, candidate image acquisition unit 12, identification unit 13, and training data output unit 14, the training data can be automatically acquired. Moreover, with the training unit 16 configured to perform training using the training data directly output from the training data output unit 14, addition and modification of the training data can be readily conducted, and comparative experiments with respect to other detection methods can also be readily conducted.

The training apparatus 1000 realizes the automatic training data acquisition and training process for training the detector of a detection target object, simply with a few query images and a query text input by the user to identify this object. This significantly improves convenience for the user.

[Exemplary Hardware Structure]

The above explained training data acquisition apparatus 100 according to the first embodiment and the training apparatus 1000 according to the second embodiment may be realized through the collaboration of hardware and software, which is a program.

Figure 11:
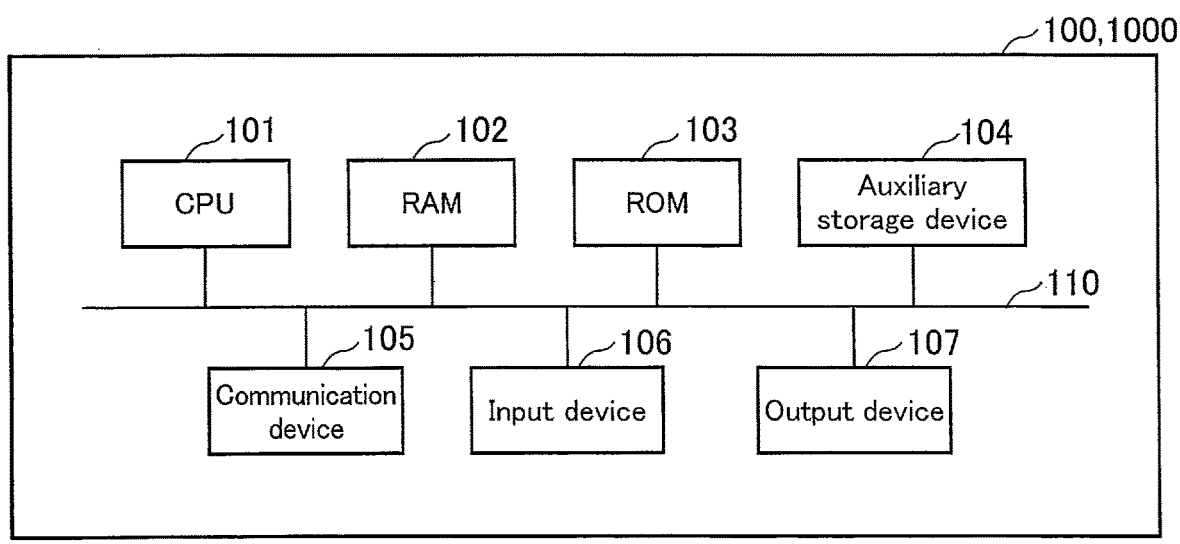
FIG. 11 is a block diagram showing a hardware structure of the training data acquisition apparatus and training apparatus according to the present embodiments.

FIG. 11 shows an exemplary hardware structure of the training data acquisition apparatus 100 and the training apparatus 1000. The training data acquisition apparatus 100 and the training apparatus 1000 may adopt the same hardware structure.

The training data acquisition apparatus 100 or training apparatus 1000 includes a central processing unit (CPU) 101, a random access memory (RAM) 102, a read only memory (ROM) 103, an auxiliary storage device 104, communication device 105, an input device 106, and an output device 107, which are coupled to each other by way of a bus 110.

The CPU 101 is a processor configured to control the entire operation of the training data acquisition apparatus 100 or the training apparatus 1000. In the training data acquisition apparatus 100, the CPU 101 expands and implements the program stored in the ROM 103 or auxiliary storage device 104 on the RAM 102 so that the CPU 101 can function as the query acquisition unit 11, candidate image acquisition unit 12, identification unit 13, and training data output unit 14. Similarly, in the training apparatus 1000, the CPU 101 implements the program so as to function as the query acquisition unit 11, candidate image acquisition unit 12, identification unit 13, training data output unit 14 and training unit 16.

The CPU 101 may include a plurality of processors. The CPU 101 may be realized in various other forms, including an integrated circuit such as an application specific integrated circuit (ASIC) and field-programmable gate array (FPGA). The above query acquisition unit 11, candidate image acquisition unit 12, identification unit 13, training data output unit 14 or training unit 16 may be realized by adopting a circuit dedicated for individual units.

The auxiliary storage device 104 may be a hard disk drive (HDD) or a solid state drive (SDD). The auxiliary storage device 104 stores programs implemented by the CPU 101, as well as the necessary data. The auxiliary storage device 104 may store the aforementioned image database 15.

The communication device 105 is a device for communicating with an external device, which may include an interface for wired or wireless local area network (LAN) communication. The communication device 105 is communicable with an external device via a network such as the Internet. The communication device 105 may further include interfaces, such as universal serial bus (USB) ports and memory card slots, for establishing a connection with an external device.

The input device 106 may be a keyboard, a mouse, a touch screen, a microphone, or a camera, through which input of a query text and a query image is received from the user of the training data acquisition apparatus 100 or training apparatus 1000. The input device 106 may further accept operations on the training data acquisition apparatus 100 or training apparatus 1000 from the user. The input device 106 outputs the input information to the CPU 101. The training data acquisition apparatus 100 or training apparatus 1000 may acquire the query text and query image through the communication device 105.

The output device 107 may be a display, a loudspeaker or the like, configured to present to the user the output information received from the CPU 101. The output device 107 may present to the user the data output from the training data output unit 14 or the parameters of the trained object detector that are output by the training unit 16, or may output such data or parameters to other devices. Various types of data output from the training data acquisition apparatus 100 or training apparatus 1000 may be transmitted via the communication device 105 to other devices.

Other Embodiments

The present invention is not limited to the above embodiments.

In the training data acquisition apparatus 100 or training apparatus 1000, a technique utilizing objectness and saliency of an image may be adopted, as described earlier, to find a region (object region) of a detection target from a candidate image at the identification unit 13. Alternatively, a template matching technique using a few acquired images of a detection target object as query inputs may also be adopted.

The threshold value $T_A$ used by the sort unit 131 and the threshold values $T_P$ and $T_N$ used by the region identification unit 132 may be freely determined. With the adjustment of the threshold value $T_A$, the ratio of the positive data and negative data in the ultimately obtained training data can be varied. By setting the threshold value $T_A$ to a larger value, the criterion for judgment of a positive candidate image will become stricter, reducing the number of candidate images sorted into positive candidate images. This will reduce the load of the process for identifying positive images at the region identification unit 132. In this case, the threshold value $T_P$ for identifying a positive image may be set to a larger value to enhance the accuracy of identifying a positive image. On the other hand, the threshold value $T_P$ may be set to a smaller value so as to completely pick up all the positive images.

In the above explanation, the sort unit 131 uses a single threshold value $T_A$ to sort a candidate image group into two groups, a positive candidate image group and a negative candidate image group. The candidate images, however, may be sorted into three or more groups. For instance, the sort unit 131 may utilize two threshold values $T_B$ and $T_C$ ($T_B > T_C$) instead of a single threshold value $T_A$ to sort the candidate images into three groups. At step S305 of FIG. 4, an image containing at least one region demonstrating a similarity larger than or equal to $T_B$ may be determined to be a positive candidate image; an image containing no region demonstrating a similarity larger than or equal to $T_C$ may be determined to be a negative candidate image; and an image that falls into neither group (containing no region demonstrating a similarity larger than or equal to $T_B$, but at least one region demonstrating a similarity larger than or equal to $T_C$) may be discarded. This can reduce a load of the subsequent process by the region identification unit 132, while improving the accuracy of the judgment.

Alternatively, if the sort unit 131 obtains the positional information of candidate object regions in an image at step S302 of FIG. 4, the positional information may be output together with the positive candidate image at step S306. If this is the case, the process at the region identification unit 132 may be omitted, and the positive candidate images and negative candidate images obtained at steps S306 and S307, respectively, may be output as-is to the training data output unit 14 as positive images and negative images. Similarly, the process at the sort unit 131 may be omitted, and the first candidate image group obtained by the candidate image acquisition unit 12 may be input at step S351 of FIG. 5, while the second candidate image group obtained by the candidate image acquisition unit 12 is input at step S361 of FIG. 5, so as to perform an identification process respectively for positive images and for negative images.

The image database 15 does not need to be provided within the training data acquisition apparatus 100, but may be provided in an external server that is accessible via the communication device 105 or the like for the training data acquisition apparatus 100. Similarly, the query acquisition unit 11, candidate image acquisition unit 12, identification unit 13, training data output unit 14, and training unit 16 of the training data acquisition apparatus 100 may be provided in multiple devices in a distributed manner, and the process may be executed by these devices operating in association with each other.

The training apparatus 1000 according to the second embodiment has been explained as incorporating the structure of the training data acquisition apparatus 100 according to the first embodiment, but this is not a limitation. The training apparatus according to the second embodiment may be realized as an apparatus separately provided from the training data acquisition apparatus 100 according to the first embodiment.

The above explained processing flows are not limited to the explained order. The order of some of the steps may be altered, or some of the steps may be performed in parallel. For instance, the process A upon a positive candidate image and the process B upon a negative candidate image of FIG. 5 may be performed in parallel, using multiple processors. This can enhance the high-speed processing. Similarly, the process A and the process B of FIG. 5 may be performed by separate devices so that distributed processing can be realized.

The above scheme may be stored as a computer-implementable program (software means) in a storage medium (memory medium) including a magnetic disk (e.g., Floppy Disk (Trademark) and hard disk), an optical disk (e.g., CD-ROM, DVD, MO), and a semiconductor memory (e.g., ROM, RAM, flash memory), or may be distributed through transmission by a communication medium. The program stored in a medium may include a setup program for setting in a computer a computer-implementable software means (including not only an implementation program but also tables and data structures). The computer that realizes the aforementioned device reads the program stored in a storage medium, constructs, if necessary, a software means by an implementation program, and controls the operation with this software means to execute the above process. The storage medium mentioned in this specification is not limited to a distribution purpose, and includes magnetic disks, semiconductor memories and the like provided inside the computer or in a device coupled via a network.

According to the training data acquisition apparatus, training apparatus, and training data acquiring method of at least one embodiment described above, a technique can be offered in which training data for training an object detection model, including positive images to which a correct label and positional information of the object are attached, can be automatically acquired, based on a few query images and a query text.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus comprising:
at least one processor configured to:
acquire a query image and a query text relating to a target object;
acquire candidate images of the target object, using the query text;
using the query image, identify from the candidate images a positive image containing a region demonstrating a similarity to the query image higher than or equal to a first threshold value, and identify a position of the region in the positive image;
output training data including the positive image, information representing the position of the region in the positive image, and a correct label based on the query text; and train an object detection model for outputting information representing a position of the target object in an input image and the correct label, using the training data, wherein the candidate images include a first candidate image and a second candidate image, and the at least one processor is further configured to:

acquire the first candidate image from a database storing an image group by conducting a search using the query text, and acquire the second candidate image by conducting a search using a query other than the query text;

identify, from the candidate images, a negative image containing no region demonstrating a similarity to the query image higher than or equal to a second threshold value; and output negative data including the negative image and a label different from the correct label.

2. The apparatus according to claim 1, wherein the at least one processor is further configured to:

sort the candidate images into positive candidate images and negative candidate images in accordance with the similarity to the query image; and identify as the positive image an image containing a region demonstrating a similarity to the query image higher than or equal to the first threshold value from the positive candidate images, identify a position of the region from the positive image, and identify as the negative image an image containing no region demonstrating a similarity to the query image higher than or equal to the second threshold value from the negative candidate images.

3. The apparatus according to claim 1, wherein the at least one processor is configured to acquire the query text based on at least one of input characters, an input image, input sound, or the query image.

4. An apparatus comprising:

a first acquisition unit configured to acquire a query image and a query text relating to a target object;

a second acquisition unit configured to acquire candidate images of the target object, using the query text;

an identification unit configured to, using the query image, identify from the candidate images a positive image containing a region demonstrating a similarity to the query image higher than or equal to a threshold value, and identify a position of the region in the positive image;

a training data output unit configured to output training data including the positive image, information representing the position of the region in the positive image, and a correct label based on the query text; and a training unit configured to train an object detection model for outputting information representing a position of the target object in an input image and the correct label, using the training data output from the training data output unit, wherein the candidate images include a first candidate image and a second candidate image, the second acquisition unit is configured to acquire the first candidate image from a database storing an image group by conducting a search using the query text, and acquire the second candidate image by conducting a search using a query other than the query text, the identification unit further identifies from the candidate images a negative image containing no region demonstrating a similarity to the query image higher than or equal to a second threshold value, and the training data output unit further outputs negative data including the negative image and a label different from the correct label.

5. The apparatus according to claim 4, wherein the identification unit comprises:

a sort unit configured to sort the candidate images into positive candidate images and negative candidate images in accordance with the similarity to the query image; and a region identification unit configured to identify as the positive image an image containing a region demonstrating a similarity to the query image higher than or equal to the first threshold value from the positive candidate images, identify a position of the region from the positive image, and identify as the negative image an image containing no region demonstrating a similarity to the query image higher than or equal to the second threshold value from the negative candidate images.

6. The apparatus according to claim 4, wherein the first acquisition unit acquires the query text based on at least one of input characters, an input image, input sound, or the query image.

7. A method comprising:

acquiring a query image and a query text relating to a target object;

acquiring candidate images of the target object, using the query text;

identifying, using the query image, from the candidate images a positive image containing a region demonstrating a similarity to the query image higher than or equal to a threshold value, and identifying a position of the region in the positive image;

outputting training data including the positive image, information representing the position of the region in the positive image, and a correct label based on the query text; and training an object detection model for outputting information representing a position of the target object in an input image and the correct label, using the training data, wherein the candidate images include a first candidate image and a second candidate image, the acquiring includes acquiring the first candidate image from a database storing an image group by conducting a search using the query text, and acquiring the second candidate image by conducting a search using a query other than the query text, the identifying further includes identifying from the candidate images a negative image containing no region demonstrating a similarity to the query image higher than or equal to a second threshold value, and the outputting includes further outputting negative data including the negative image and a label different from the correct label.

8. The method according to claim 7, wherein the identifying includes:

sorting the candidate images into positive candidate images and negative candidate images in accordance with the similarity to the query image; and identifying as the positive image an image containing a region demonstrating a similarity to the query image higher than or equal to the first threshold value from the positive candidate images, identifying a position of the region from the positive image, and identifying as the negative image an image containing no region demonstrating a similarity to the query image higher than or equal to the second threshold value from the negative candidate images.

9. The method according to claim 7, wherein
the acquiring includes acquiring the query text based on at least one of input characters, an input image, input sound, or the query image.

10. A non-transitory computer readable medium including computer executable instructions, wherein the instructions, when executed by a processor, cause the processor to perform a method comprising:
  acquiring a query image and a query text relating to a target object;
  acquiring candidate images of the target object, using the query text;
  identifying, using the query image, from the candidate images a positive image containing a region demonstrating a similarity to the query image higher than or equal to a threshold value, and identifying a position of the region in the positive image;
  outputting training data including the positive image, information representing the position of the region in the positive image, and a correct label based on the query text; and
  training an object detection model for outputting information representing a position of the target object in an input image and the correct label, using the training data,
  wherein
    the candidate images include a first candidate image and a second candidate image,
    the acquiring includes acquiring the first candidate image from a database storing an image group by conducting a search using the query text, and acquiring the second candidate image by conducting a search using a query other than the query text,
    the identifying further includes identifying from the candidate images a negative image containing no region demonstrating a similarity to the query image higher than or equal to a second threshold value, and
    the outputting includes further outputting negative data including the negative image and a label different from the correct label.

11. The non-transitory computer readable medium according to claim 10, wherein
the identifying includes:
  sorting the candidate images into positive candidate images and negative candidate images in accordance with the similarity to the query image; and
  identifying as the positive image an image containing a region demonstrating a similarity to the query image higher than or equal to the first threshold value from the positive candidate images, identifying a position of the region from the positive image, and identifying as the negative image an image containing no region demonstrating a similarity to the query image higher than or equal to the second threshold value from the negative candidate images.

12. The non-transitory computer readable medium according to claim 10, wherein
the acquiring includes acquiring the query text based on at least one of input characters, an input image, input sound, or the query image.

* * * * *